(12) United States Patent
Chen et al.

(10) Patent No.: US 12,247,129 B2
(45) Date of Patent: *Mar. 11, 2025

(54) SEED COATINGS, COATING COMPOSITIONS AND METHODS FOR USE

(71) Applicant: SPECIALTY OPERATIONS FRANCE, Lyons (FR)

(72) Inventors: Zhiyun Chen, Newtown, PA (US); Jean-Christophe Castaing, Sèvres (FR); Peng Fei Ji, Shanghai (CN); Galder Cristobal, Singapore (SG)

(73) Assignee: SPECIALTY OPERATIONS FRANCE, Lyons (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,753

(22) Filed: Feb. 1, 2022

(65) Prior Publication Data

US 2022/0154030 A1 May 19, 2022

Related U.S. Application Data

(63) Continuation of application No. 16/929,565, filed on Jul. 15, 2020, which is a continuation of application No. 15/955,015, filed on Apr. 17, 2018, now Pat. No. 10,745,578, which is a continuation-in-part of application No. 13/407,119, filed on Feb. 28, 2012, now abandoned.

(60) Provisional application No. 61/464,117, filed on Feb. 28, 2011.

(51) Int. Cl.
| | | |
|---|---|---|
| C09D 105/00 | (2006.01) | |
| A01C 1/06 | (2006.01) | |
| A01N 25/10 | (2006.01) | |
| C05G 3/00 | (2020.01) | |
| C08L 99/00 | (2006.01) | |
| C09D 101/02 | (2006.01) | |
| C09D 103/02 | (2006.01) | |
| C09D 105/04 | (2006.01) | |
| C09D 105/06 | (2006.01) | |
| C09D 105/08 | (2006.01) | |

(52) U.S. Cl.
CPC ............. *C09D 105/00* (2013.01); *A01C 1/06* (2013.01); *A01N 25/10* (2013.01); *C05G 3/00* (2013.01); *C08L 99/00* (2013.01); *C09D 101/02* (2013.01); *C09D 103/02* (2013.01); *C09D 105/04* (2013.01); *C09D 105/06* (2013.01); *C09D 105/08* (2013.01)

(58) Field of Classification Search
None
See application file for complete search history.

(56) References Cited

U.S. PATENT DOCUMENTS

| | | | | |
|---|---|---|---|---|
| 9,096,793 | B2 * | 8/2015 | Cristobal | C05G 3/80 |
| 9,795,134 | B2 * | 10/2017 | Ji | A01C 1/06 |
| 10,087,369 | B2 * | 10/2018 | Cristobal | C09K 17/22 |
| 11,111,436 | B2 * | 9/2021 | Cristobal | A01G 22/55 |
| 2005/0256001 | A1 | 11/2005 | Smith et al. | |
| 2006/0054332 | A1 * | 3/2006 | Bowsher | A01B 35/28 |
| | | | | 172/21 |
| 2010/0267790 | A1 * | 10/2010 | Voeste | A01N 43/653 |
| | | | | 514/384 |
| 2010/0275511 | A1 * | 11/2010 | Berger | A01C 1/06 |
| | | | | 47/57.6 |

FOREIGN PATENT DOCUMENTS

| | | | |
|---|---|---|---|
| CN | 102219608 A | | 10/2011 |
| JP | H0523013 A | * | 2/1993 |

OTHER PUBLICATIONS

Office Action issued in U.S. Appl. No. 16/929,565; Dated Mar. 31, 2022 (8 pages).

* cited by examiner

*Primary Examiner* — Alton N Pryor
(74) *Attorney, Agent, or Firm* — Osha Bergman Watanabe & Burton LLP

(57) ABSTRACT

A seed or seedling is coated with underivatized guar, cationic hydroxypropyl guar, polyacrylamide, poly(methacrylic acid), poly(acrylic acid), polyacrylate, poly(ethylene glycol), polyethyleneoxide, poly(vinyl alcohol), polyglycerol, polytetrahydrofuran, polyamide, hydroxypropyl guar, carboxymethyl guar, carboxymethylhydroxypropyl guar, underivatized starch, cationic starch, corn starch, wheat starch, rice starch, potato starch, tapioca, waxy maize, sorghum, waxy sarghum, sago, dextrin, chitin, chitosan, xanthan gum, carageenan gum, gum karaya, gum arabic, pectin, cellulose, hydroxycellulose, hydroxyalkyl cellulose, hydroxyethyl cellulose, carboxymethylhydroxyethyl cellulose, or hydroxypropyl cellulose, the coated seed or seedling having a shelf-life at room temperature in ambient conditions in an unsealed container to at least two months.

16 Claims, No Drawings

SEED COATINGS, COATING COMPOSITIONS AND METHODS FOR USE

CROSS-REFERENCE TO RELATED APPLICATIONS

This application claims the benefit of pending application Ser. No. 16/929,565, filed Jul. 15, 2020 which claims the benefit of application Ser. No. 15/955,015, filed Apr. 17, 2018, which claims the benefit of application Ser. No. 13/407,119, filed Feb. 28, 2012, which in turn claimed the benefit of Provisional Application Ser. No. 61/464,117, filed Feb. 28, 2011, all of which are hereby incorporated by reference.

FIELD OF INVENTION

This invention relates to methods and compositions relating to agricultural coatings and, in particular, to seeds or agglomeration of seeds coated with guar or guar derivatives, and methods for use.

BACKGROUND OF THE INVENTION

Seeds are sometimes commercially treated to promote good seedling establishment. Protection of seeds and young seedlings from pests in and around the soil during the early stages of plant growth is one concern. Another concern is the protection of seeds and seedlings from drought or damage from lack of available water.

U.S. Pat. No. 4,543,370 appears to describe seed coatings containing a cellulosic film-forming polymer, a pigment, a plasticizer, silica and a surfactant.

U.S. Pat. Nos. 4,513,019 and 4,576,646 describe a process for coating seeds with a cellulosic film-forming composition, at least one alpha-cellulose, and a suitable plasticizer.

SUMMARY OF INVENTION

Described herein are dry seed coating compositions that promote seedling establishment through water retention or water absorption. Also described herein are dry seed coating compositions that promote seedling establishment as one or more layers of the seed coating composition act as a wetting agent, which wets the adjacent/surrounding area of soil around the seed. Also described herein are dry seed coating compositions that promote seedling establishment. Further, described herein are dry coating compositions that promote the retention of active ingredients or agricultural compounds in the soil, such that the agricultural compounds are available or more readily available to plants, vegetation, grasses, trees, and the like. Further, described herein are coating compositions that promote the ability to maintain or sustain active ingredients or agricultural compounds in the soil, such that the active ingredients are available or more readily available to plants, vegetation, grasses, trees, and the like. Currently, one drawback when applying active ingredients or agricultural compounds, such as pesticides, herbicides, and the like, to soil is that these agricultural compounds active ingredients or are lost with water runoff or drainage, and thus not available for grass and plants and the like. The phrases "dry seed coating compositions" and "dry coating composition" are defined herein as excluding hydrogels but not excluding seeds which comprise normal moisture which is necessary to maintain viability.

In one embodiment, described herein are dry coating compositions that promote seedling establishment and plant growth as one or more layers of the coating composition aids as a carrier or retention agent for active ingredients such as fertilizers, pesticides and the like, e.g., improved adhesion of any pesticidal formulation. In one embodiment, the dry coating composition aids in the ability to maintain the distribution of said pesticides, fertilizers, herbicides, etc. during the application of the treatment.

Also described herein are dry seed coating compositions that promote seedling establishment as one or more of the layers of the seed coating composition can act as an antibacterial agent. Also described herein are dry seed coating compositions that promote seedling establishment, wherein the seed coating comprises multiple layers, each layer individually capable of providing one or more of the benefits as described herein.

Also described herein are dry seed coating compositions wherein one or more layers comprise guars or guar derivatives as improved film-formation agents that can likewise act as a binding agent, where the guar or guar derivatives can be utilized as a film former, a binder or a combination of both. In one embodiment, the dry seed coating compositions described herein are substantially uniform in diameter such that flow of the seeds during application (e.g., spraying) is improved.

The promotion of seedling establishment can minimize yield loss of crops, grasses, shrubs and the like, can maintain and improve the quality of the seeds and can help to avoid the spread of harmful organisms.

In one embodiment, the invention relates to compositions and methods related to seedling establishment, which has an impact on improving yield of crops, as well as agricultural and horticultural plants, shrubs, trees, grasses and the like. In one embodiment, the invention relates to compositions and methods related to prevention of agricultural compounds, such as pesticides, fertilizers, herbicides, and the like, lost to water runoff or drainage (wherein when lost to runoff or drainage, such agricultural compounds are not available for grass and plants and the like).

Applications targeted include agricultural uses to increase the yield of crops or to secure the crop in very hostile areas (non-irrigated zones, warm to hot climates, windy areas, scarce precipitation, or a combination of these). Some targeted markets include: agriculture for non-irrigated crops (including but not limited to wheat, cotton, etc.); agriculture for irrigated crops (including but not limited to horticulture-based plants); arboriculture, forestry and gardening; golf courses; sport and park turf; seeding additive for plant nurseries; and fruits, among others.

In one aspect, described herein are dry coating compositions comprising at least one seed and at least one layer coating all or part of the seed, the layer selected from the group consisting of guar, derivatized guar, polyacrylamide, poly(methacrylic acid), polyvinylpyridine, polyvinylpyrrolidone, poly(acrylic acid), polyacrylate, poly(ethylene glycol), phosphonate-end capped polymers, polyethyleneoxide, poly(vinyl alcohol), polyglycerol, polytetrahydrofuran, polyamide, hydroxypropyl guar, carboxymethyl guar, carboxymethylhydroxypropyl guar, starch, derivatized starch, cationic starch, corn starch, wheat starch, rice starch, potato starch, tapioca, waxy maize, sorghum, waxy sorghum, sago, dextrin, chitin, chitosan, alginate compositions, xanthan gum, carrageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and a combination of any of the foregoing. The derivatized guar, in one embodiment, is cationic guar. In one embodiment, suitable cationic guar derivatives include cationically modified polymers such as guar and hydroxypropyl guar and alkyl guar, more typically cationic hydroxylpropyl guar, as well as salts thereof. A typical cationic functional group in these cation guar derivatives is trimethylamino(2-hydroxyl)propyl, with chloride as the counter ion.

It is understood, however, that various counter ions can be utilized, including but not limited to halides (e.g., chloride, fluoride, bromide, iodide), sulfate, methylsulfate, and mixtures thereof. In other embodiments, suitable cationic guar derivatives include cationically modified alkylated carboxylated polymers such as methyl and ethyl carboxymethyl guar and cationic hydroxypropyl guar, more typically cationic hydroxypropyl guar.

In one aspect, described herein are dry coating compositions comprising at least one layer coating all or part of an agricultural compound or active ingredient, the layer selected from the group consisting of guar, derivatized guar, polyacrylamide, poly(methacrylic acid), polyvinylpyridine, polyvinylpyrrolidone, poly(acrylic acid), polyacrylate, poly(ethylene glycol), phosphonate-end capped polymers, polyethyleneoxide, poly(vinyl alcohol), polyglycerol, polytetrahydrofuran, polyamide, hydroxypropyl guar, carboxymethyl guar, carboxymethylhydroxypropyl guar, starch, derivatized starch, cationic starch, corn starch, wheat starch, rice starch, potato starch, tapioca, waxy maize, sorghum, waxy sorghum, sago, dextrin, chitin, chitosan, alginate compositions, xanthan gum, carrageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and a combination of any of the foregoing. The derivatized guar, in one embodiment, is cationic guar. In one embodiment, suitable cationic guar derivatives include cationically modified polymers such as guar and hydroxypropyl guar and alkyl guar, more typically cationic hydroxypropyl guar, as well as salts thereof. A typical cationic functional group in these cation guar derivatives is trimethylamino(2-hydroxyl)propyl, with chloride as the counter ion. It is understood, however, that various counter ions can be utilized, including but not limited to halides (e.g., chloride, fluoride, bromide, iodide), sulfate, methylsulfate, and mixtures thereof. In other embodiments, suitable cationic guar derivatives include cationically modified alkylated carboxylated polymers such as methyl and ethyl carboxymethyl guar and cationic hydroxypropyl guar, more typically cationic hydroxypropyl guar.

In one embodiment, the seed coating composition can also comprise a binder. The binder (or any of the layers) can be molasses, granulated sugar, alginates, karaya gum, jaguar gum, tragacanth gum, polysaccharide gum, mucilage, gelatin, polyvinyl acetates, polyvinyl acetate copolymers, polyvinyl alcohols, polyvinyl alcohol copolymers, celluloses (including ethylcelluloses and methylcelluloses, hydroxypropylcelluloses, hydroxymethyl celluloses, hydroxymethylpropyl-celluloses), polyvinylpyrolidones, dextrins, maltodextrins, polysaccharides, fats, oils, proteins, gum arabics, shellacs, vinylidene chloride, vinylidene chloride copolymers, calcium lignosulfonates, acrylic copolymers, starches, derivatized starches, polyvinylacrylates, zeins, carboxymethylcellulose, chitosan, polyethylene oxide, acrylimide polymers and copolymers, polyhydroxyethyl acrylate, methylacrylamide monomers, alginate, ethylcellulose, polychloroprene, syrups or any combination thereof.

In another embodiment, the seed coating composition contains at least one active ingredient. The active ingredient can be one or more herbicides, plant growth regulators, crop dessicants, fungicides, bacteriocides, bacteriostats, insecticides, insect repellants, triazine herbicides, sulfonylurea herbicides, uracils, urea herbicides, acetanilide herbicides, organophosphonate herbicides, glyphosate salts, glyphosate esters, nitrilo oxime fungicides, imidazole fungicides, triazole fungicides, sulfenamide fungicides, dithio-carbamate fungicides, chloronated aromatic, dichloro aniline fungicides, carbamate insecticides, organo thiophosphate insecticides; perchlorinated organic insecticides, methoxychlor, miticides, propynyl sulfite, triazapentadiene miticides, chlorinated aromatic miticides, tetradifan, dinitrophenol miticides, binapacryl, adjuvants, surfactants, fertilizers or any mixture thereof.

In one embodiment, the layer comprises guar or a guar derivative. Guar derivatives include but are not limited to, carboxymethyl guar, hydroxyethyl guar, hydroxypropyl guar, carboxymethylhydroxypropyl guar, cationic guar, cationic hydroxypropyl guar, carboxymethyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar, or any combination thereof. In another embodiment, the seed coating composition can optionally comprise a filler.

In another aspect, described herein are dry seed coating compositions comprising an agglomeration of from between 2 seeds to 100 seeds, and at least one layer selected from the group consisting of a film-forming layer, a layer of a filler, a layer of a binding agent, a layer of a wetting agent, a layer of an anti-bacteria agent, a layer of an active ingredient and any combination thereof. It is understood that the seed coating composition can have more than 1 layer, for example, 2, 3, 4 or 5 or more layers. As an example, the seed coating composition can comprise 3 layers, a first layer comprises a film-forming layer, the second layer comprises fully or in part a binding agent, while the third layer comprises fully or in part a wetting agent. In another example, the seed coating composition can comprise 2 layers, the first layer comprises a film-forming layer, while the second layer comprises an anti-bacteria agent in whole or in part. The number of layers can be chosen to be suitable for a desired application (e.g., dry climate versus tropical). The type of layers described herein can also be varied according to desired sequence, for example, the outermost layer can be a wetting agent while the innermost layer can be an anti-bacteria agent, or, as another example, the outermost layer can be a film-forming layer, while the innermost layer can be a filler layer. It is also understood that some layers can have more than one property; for example, a seed coating composition described herein can have one layer, however, that layer comprises, in part, a binder and, in part, an anti-bacteria agent.

In yet another aspect, described herein are methods for preparing a seed coating composition comprising the steps of providing an agglomeration of two or more seeds, providing at least one guar or guar derivative; and contacting the guar or guar derivative to the seed to coat all or a portion of the seed. The methods, in one embodiment, can further comprise the step of forming an agglomeration of two or more seeds by applying an agglomeration agent to two or more seeds. In some embodiments, the agglomeration contains less than 100 seeds, while in other embodiments, the agglomeration contains less than 25 seeds, and in further embodiments, the agglomeration contains less than 10 seeds.

DETAILED DESCRIPTION OF INVENTION

A seed is coated for various reasons such as to aid is sustaining the seed is adverse conditions, to aid in propagating the seed, to provide a protective layer for the seed, when the seed is too small or non-uniform (from seed to seed) and the shape of sown seeds is desired to be uniform, and the like. In one embodiment, seed coating compositions described herein are prepared such that they are smoother, rounder, more uniform, and optionally, can also be larger and/or heavier than the original seed. Techniques utilized to "sow" the seed can vary from a belt, plate, cup, vacuum or the like. The seed coating composition can be placed individually, with improved spacing and depth control. The seed coating composition described herein can flow better through the seeding mechanism, because their surface is smoother than that of non-coated seed.

Some embodiments comprise methods utilizing seed coating compositions that are easy to synthesize. In one embodiment, seed coating compositions described herein are sprayed/casted onto the soil surface or introduced in the soil volume. There are several ways in which to apply the seed coating compositions described herein to the soil.

The seed coating composition can be applied to or mixed into the soil using various methods. Some methods include but are not limited to: creating a hole in the soil with pressurized water then introducing the seed coating composition into the hole with pressurized air; removing small plugs from the soil (e.g., aeration of golf greens) and introducing the seed coating composition into the hole. Yet other methods also include mixing by applying the seed coating composition on the surface of the target soil area and then mixing or homogenously mixing the target soil area.

Yet another method of applying the dry seed coating compositions described herein to the target soil area is through casting or spraying. Some techniques may be similar to fertilizer application techniques, which include but are not limited to broadcasting (distribution over a majority or part of a cropped field), placement (application in bands or in pockets near the plants or plant rows) as well as application using low or high volume sprayers.

It is understood that the term "seed" or "seedling" is not limited to a specific or particular type of species or seed. The term "seed" or "seedling" can refer to seed from a single plant species, a mixture of seed from multiple plant species, or a seed blend from various strains within a plant species. In one embodiment, crop seeds include but are not limited to rice, corn, wheat, barley, oats, soybean, cotton, sunflower, alfalfa, sorghum, rapeseed, sugarbeet, tomato, bean, carrot, tobacco or flower seeds.

Polymer Coatings

In one embodiment, the at least one layer of the seed coating composition can comprise (in whole or partially) synthetic polymers, natural polymers or derivatives thereof. Such polymers are not particularly limited and can be homopolymers, as well as random or block or any other types of copolymers made from any polymerizable monomer.

In one embodiment, the polymerizable monomers are typically water-soluble chargeable monomers having carboxylic groups, sulfonate groups, phosphonate groups and the like. In one embodiment, the polymerizable monomers having one or more carboxylic groups include but are not limited to acrylic acid, methacrylic acid, crotonic acid, sorbic acid, maleic acid, itaconic acid, cinnamic acid, its salt or the like, or an anhydride thereof (maleic anhydride or the like). The counterion of such polymerizable monomer salts include any suitable counterion including but not limited to alkyl ammonium, halides, sodium, calcium, potassium, barium, lithium, magnesium, ammonium cation, and the like.

The polymerizable monomers include also neutral, typically water-soluble monomers or monomers, such as radically polymerizable acrylates, methacrylates, acrylamides, methacrylamides, vinyl alcohol, allyl alcohols, vinyl acetates, betaine-containing vinyl monomers (including but not limited to carboxyl betaines and sulfobetaines), and other ethylenically unsaturated monomers. The polymers can also include component polymers from other polymerization techniques such as condensation, anionic polymerization, cationic polymerization, ring opening polymerization, coordination polymerization, metathesis polymerization, etc., as exemplified by poly(alkylene oxides) (including but not limited to poly(ethylene glycol), poly(propylene glycol), and polytetrahydrofuran), polyglycerol, polyamine, polyester, polyamide, derivatives of any of the foregoing and/or copolymers of any of the foregoing.

In one exemplary embodiment, the synthetic polymers include but are not limited to polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran and polyamide. The phosphonate end-capped polymers, for example, can be any of the herein described polymers or copolymers containing a phosphonate or phosphate terminating end-group or end-groups.

Examples of suitable polysaccharides include but are not limited to galactomannan polymers, guar, derivatized guar, starch, derivatized (e.g., cationic) starch, dextrins, chitin/chitosan, alginate compositions, cassia gum, tara gum, xanthan gum, locust beam gum, carrageenan gum, gum karaya, gum arabic, succinoglycan, pectin, crystalline polysaccharides, branched polysaccharide, cellulose, as well as other derivatives thereof such as ionic and/or non-ionic derivatives and other derivates of any of the foregoing.

Examples of suitable cellulose include but are not limited to hydroxycelluloses, hydroxyalkyl cellulose, including hydroxyethyl cellulose, carboxymethylhydroxyethyl cellulose, hydroxypropyl cellulose, carboxymethylcellulose and other modified celluloses.

Examples of suitable starch sources include but are not limited to corn starch, wheat starch, rice starch, potato starch, tapioca, waxy maize, sorghum, waxy sorghum, sago and modified starches. Examples of modified starches include cationic, dextrinated, hydrolysed, oxidized, cross-linked, alkylated, hydroxyalkylated, acetylated, fractionated (e.g. amylose and amylopectin), and physically modified starches, among others.

Guar

Examples of suitable guar or derivatized guar include but are not limited to guar, hydroxypropyl guar, carboxymethyl guar, carboxymethylhydroxypropyl guar, and other modified guar. It is understood that the term "guar" and "guar gum" is interchangeable as used herein. In one embodiment, the derivatized guar includes but is not limited to carboxymethyl guar, hydroxyethyl guar, hydroxypropyl guar, carboxymethylhydroxypropyl guar, cationic guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, hydrophobically modified cationic guar, or any combination thereof.

In one embodiment, the a polymer comprising a layer has a weight average molecular weight of between about 5,000 daltons and 500,000 daltons. In another embodiment, the polymer has a weight average molecular weight of between about 200,000 daltons and 1,000,000 daltons. In another embodiment, the soil additive is a polymer having a weight average molecular weight of up to about 5,000,000 daltons. In another embodiment, the soil additive is a polymer having a weight average molecular weight of up to about 25,000,000 daltons. In a further embodiment, the soil additive is a polymer having a weight average molecular weight of up to about 50,000,000 daltons.

Typically, when a layer is acting as a wetting agent, the polymer utilized is generally associated with lower (weight average) molecular weight, typically less than about 700,000 dalton, or in another embodiment less than 500,000 daltons, or less than about 100,000 daltons. Typically, when a layer is acting as a water retention agent, the polymer utilized is generally associated with a higher (weight average) molecular weight, which in one embodiment is greater than about 500,000 daltons, in another embodiment greater than about 800,000 daltons, and in yet another embodiment greater than about 1,000,000 daltons, and in a further embodiment greater than about 2,000,000 daltons.

The polymers may also be cross-linked or non-cross-linked, or to some degree a combination of both. The crosslinking agents utilized can include but are not limited to copper compounds, magnesium compounds, borax, glyoxal, zirconium compounds, titanium compounds (for example, titanium IV compounds such as titanium lactate, titanium malate, titanium citrate, titanium ammonium lactate, polyhydroxy complexes of titanium, titanium triethanolamine, and titanium acetylacetonate), calcium compounds, aluminum compounds (such as, for example, aluminum lactate or aluminum citrate), p-benzoquinone, dicarboxylic acids and their salts, phosphite compounds and phosphate compounds. In another embodiment, the cross-linking agent is a chemical compound containing a polyvalent ion such as, but not necessarily limited to, boron or a metal such as chromium, iron, aluminum, titanium, antimony and zirconium, or mixtures of polyvalent ions.

In some embodiments, one or more layers described herein can act as a "film-coating", typically, a guar or guar derivative comprising a layer. A thin film can smooth the surface of the seed coating composition for better flow ability. The film-coating also influences water uptake and the adherence of additional ingredients, such as for example chemical fungicide treatments. In some embodiments, film coating only increases the raw weight of the seed or agglomerates 1% to 5%, far less than traditional powder coatings. In some embodiments, up to 10%, in other embodiment up to 25%, up to, 15%, 40%, 50%

In another embodiment, a film-coating layer, which can comprise guar or a guar derivative such as a cationic guar, can prevent the moisture from leaving the seed. Such a film-coating layer can extend the shelf-life of the seed. "Shelf-life" of a seed, as the term is used herein, is measured at room temperature in ambient conditions in an unsealed container without added salts or adjuvants. In a first embodiment, the film-coating layer extends the shelf-life of a seed by at least two months, in other embodiments, by at least three months, in yet other embodiments, by at least four months, in further embodiments, by at least six months, in other embodiments, by at least eight months, in yet other embodiments, by at least twelve months, and in other embodiments, by at least eighteen months. Every seed has a shelf-life, depending on individual characteristics such as size and other seed characteristics, which coincides with a seed's dormant state. (Normally, in dormant state, but there has to be minimum water content to sustain the seed in such a state.) For example, grass seeds have a shelf-life of about one year before the seeds are generally no longer viable. In other words, the dry seed coating compositions described herein can promote the survival rate of the seed.

In yet another embodiment, the film-coating layer can act as barrier against water loss from the seed. This, in turn, can promote the survival rate of the seed.

In another embodiment, it is believed the film-coating layer can act as an anti-bacterial agent, which in particular is a derivatized guar, specifically cationic guar. Such a cationic guar typically takes a longer time to degrade than other layers or coating layers. In addition, once such a cationic guar film-coating layer degrades, in its degraded state, the cationic guar is able to kill bacteria or inhibit the growth of bacteria.

Binder

The seed coating composition can also comprise a binder as one of the layers, the binder sometimes referred to as an adhesive. In one embodiment, the binder can include but is not limited to molasses, granulated sugar, alginates, karaya gum, guar gum, tragacanth gum, polysaccharide gum, mucilage or any combination of the foregoing. In another embodiment, the binder is chosen from, but is not limited to, gelatin, polyvinyl acetates, polyvinyl acetate copolymers, polyvinyl alcohols, polyvinyl alcohol copolymers, celluloses (including ethylcelluloses and methylcelluloses, hydroxypropylcelluloses, hydroxymethyl celluloses, hydroxymethylpropyl-celluloses), polyvinylpyrolidones, dextrins, maltodextrins, polysaccharides, fats, oils, proteins, gum arabics, shellacs, vinylidene chloride, vinylidene chloride copolymers, calcium lignosulfonates, acrylic copolymers, starches, polyvinylacrylates, zeins, carboxymethylcellulose, chitosan, polyethylene oxide, acrylamide polymers and copolymers, polyhydroxyethyl acrylate, methylacrylamide monomers, alginate, ethylcellulose, polychloroprene, syrups or any combination of the foregoing.

Active Ingredients

Compounds suitable as active ingredients, which in some embodiments form all or part of at least one layer of the seed coating composition, include but are not limited to herbicides, plant growth regulators, crop dessicants, fungicides, bacteriocides, bacteriostats, insecticides, and insect repellants. Suitable pesticides include, for example, triazine herbicides; sulfonylurea herbicides; uracils; urea herbicides; acetanilide herbicides; and organophosphonate herbicides such as glyphosate salts and esters. Suitable fungicides include, for example, nitrilo oxime fungicides; imidazole fungicides; triazole fungicides; sulfenamide fungicides; dithiocarbamate fungicides; chlorinated aromatic; and dichloro aniline fungicides. Suitable insecticides, include, for example, carbamate insecticides; organo thiophosphate insecticides; and perchlorinated organic insecticides such as methoxychlor. Suitable miticides include, for example, propynyl sulfite; triazapentadiene miticides; chlorinated aromatic miticides such as tetradifan; and dinitrophenol miticides such as binapacryl. Other active ingredients can comprise adjuvants, surfactants, fertilizers.

In one embodiment, the coating composition comprises at least one layer coating all or part of one or more active ingredients, described herein, the layer selected from the group consisting of guar, derivatized guar, polyacrylamide, poly(methacrylic acid), polyvinylpyridine, polyvinylpyrrolidone, poly(acrylic acid), polyacrylate, poly(ethylene glycol), phosphonate-end capped polymers, polyethyleneoxide, poly(vinyl alcohol), polyglycerol, polytetrahydrofuran, polyamide, hydroxypropyl guar, carboxymethyl guar, carboxymethylhydroxypropyl guar, starch, derivatized starch, cationic starch, corn starch, wheat starch, rice starch, potato starch, tapioca, waxy maize, sorghum, waxy sorghum, sago, dextrin, chitin, chitosan, alginate compositions, xanthan gum, carrageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing and a combination of any of the foregoing. The derivatized guar, in one embodiment, is cationic guar. In one embodiment, suitable cationic guar derivatives include cationically modified polymers such as guar and hydroxypropyl guar and alkyl guar, more typically cationic hydroxypropyl guar, as well as salts thereof. A typical cationic functional group in these cation guar derivatives is trimethylamino(2-hydroxyl)propyl, with chloride as the counter ion. It is understood, however, that various counter ions can be utilized, including but not limited to halides (e.g., chloride, fluoride, bromide, iodide), sulfate, methylsulfate, and mixtures thereof. In other embodiments, suitable cationic guar derivatives include cationically modified alkylated carboxylated polymers such as methyl and ethyl carboxymethyl guar and cationic hydroxypropyl guar, more typically cationic hydroxypropyl guar.

Filler

The seed coating composition can also include at least one filler as all or part of a layer. In one embodiment, the filler is selected from nonlimiting examples such as wood flours, clays, activated carbon, carbohydrates, sugars, dextrins, maltodextrins, diatomaceous earth, cereal flours, wheat flour, oat flour, barley flour, fine-grain inorganic solids, calcium carbonate, calcium bentonite, kaolin, china clay, talc, perlite, mica, vermiculite, silicas, quartz powder, montmorillonite or mixtures thereof.

Nutrients

The seed coating composition can also comprise a nutrient such as a micronutrient or macronutrient. The nutrient can comprise one or more layers of the seed coating composition, as well as comprise all or part of a layer. The nutrient can also be included with the grouping of seeds as part of the binder or adhesive. "Nutrient" as used herein can refer to an additive or substance utilized by plants, grasses, shrubs for plant, grass, and shrub growth, respectively. Macronutrients can be utilized in larger amounts by plants, grasses, etc. in proportionally larger amounts relative to micronutrients. Nutrients include but are not limited to manganese, boron, copper, iron, chlorine, molybdenum, and zinc, potassium, nitrogen, calcium, magnesium phosphorus and sulfur, among others. Compositions of the present invention can include various combinations and relative amounts of individual macronutrients.

Method of Creating the Polymers

There are several production processes for making the seed coating that forms part of the seed coating composition. In one embodiment, the seed coating is a suitable synthetic polymer wherein methods for making such synthetic polymers are documented in U.S. Pat. No. 5,202,400. Polymers can be made from radical polymerization, condensation, anionic polymerization, cationic polymerization, ring open polymerization, coordination polymerization, and metathesis polymerization, and the like. Examples of suitable radical polymerization processes include but are not limited to solution polymerization process, emulsion polymerization process, suspension polymerization process, reverse-phase suspension polymerization process, thin film polymerization process, and spray polymerization process, and the like.

Methods for making suitable natural polymer derivatives are also generally known in the art. The cross-linking processes of polysaccharides are described in US Publication No. 20030027787 and U.S. Pat. No. 5,532,350.

Seed Coating Composition

The seed coating composition in one embodiment comprises at least one seed and at least one layer that coats all or part of the seed. In one embodiment, the layer comprises guar, derivatized guar, polyacrylamide, poly(methacrylic acid), poly(acrylic acid), polyacrylate, poly(ethylene glycol), phosphonate-end capped polymers, polyethyleneoxide, poly(vinyl alcohol), polyglycerol, polytetrahydrofuran, polyamide, hydroxypropyl guar, carboxymethyl guar, carboxymethyl hydroxypropyl guar, starch, derivatized (e.g., cationic) starch, corn starch, wheat starch, rice starch, potato starch, tapioca, waxy maize, sorghum, waxy sorghum, sago, dextrin, chitin, chitosan, alginate compositions, xanthan gum, carrageenan gum, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing or a combination of any of the foregoing. As non-limiting examples, the layer can comprise a 90 wt % derivatized guar and 10 wt % starch (or derivatized starch) mixture, or a 60 wt % hydroxypropyl guar and 40 wt % carboxymethyl hydroxypropyl guar mixture.

More typically, the layer comprises guar or derivatized guar. It has been surprisingly found that derivatized guars are excellent film formers and can be used as a binder to coat the seed or seeds. It has also been surprisingly found that derivatized guars are good wetting agents as they can hydrophilize or attract water to the area of soil surrounding the seed.

In some embodiments, the layer can act as a carrier coating. Fungicides and beneficial microbials that protect the seed and emerging seedling are carried in the carrier coating. For example, alfalfa seed coating with incorporated rhizobacteria is used to inoculate the field with beneficial microbial.

Agglomeration

In one embodiment, a seed is typically coated when the non-coated or raw seed is too small, light or variable in shape or size to be sown accurately with equipment currently used. Thus, it is desirable for farmers, growers, etc. to be able to precisely sow a crop. Such precision sowing is desirable when growers need strict control of spacing or depth of placement. This is also important for crops that are direct sown and then thinned back to the desired population, i.e., field thinning. Incidence of "skips" or "doubles" can be reduced and seedlings can be more accurately spaced (for example, with a deviation of less than 0.5 inches on center in the row as opposed to traditional techniques with deviations of greater than several inches). In some instances, it is desirable to agglomerate two or more seeds to create a uniform size for improved or efficient sowing.

An aspect of the invention includes agglomerates of seed. The agglomerate or grouping of seed, in one embodiment, is a grouping of 2 or more individual seeds together. In another embodiment, the agglomerate is a grouping of more than 5 individual seeds together. In a further embodiment, the agglomerate is a grouping of more than 10 individual seeds together. In yet another embodiment, the agglomerate is a grouping of more than 25 individual seeds together. In yet a further embodiment, the agglomerate is a grouping of more than 50 individual seeds together. In another embodiment, the agglomerate is a grouping of more than 100 individual seeds together.

The agglomeration of seed can aid in the application of the seed coating composition because the seed coating composition, when using an agglomeration of seed, can be shaped or formed to be consistent in shape or form. For example, the agglomeration can be formed as spherical or substantially spherical, thus allowing the seed coating composition to be likewise substantially spherical. This can allow for improved or more consistent casting or spraying, can minimize the occurrence of blockage or clogging of the nozzles, hoses, etc. due to uneven particle size distribution. Typically, a binder or adhesive is utilized to bunch (e.g., agglomerize) the grouping of seeds together.

The agglomeration can also aid in seed or seedling establishment as a layer of the wetting agent (or other layer than affects the soil) can be concentrated to a local area of soil, thus, increasing its chance of wetting the soil surrounding the seed(s). the agglomeration can also promote survival by allowing the seeds, when germinating into seedlings, to generate sufficient force to penetrate hydrophobic areas or soil such as, for example, a hydrophobic (i.e., encrusted) soil surface In one embodiment, the seed coating composition comprising an agglomeration of seeds of from between 2 seeds to 100 seeds, typically between 2 to 50 seeds, typically between 2 to 25 seeds; and at least one layer selected from the group consisting a layer of a filler, a layer of a binding agent, a layer of a wetting agent, a layer of an anti-bacteria agent, a layer of an active ingredient and any combination thereof.

In another embodiment, a method for preparing a seed coating composition comprises the steps of: providing at least one seed; providing at least one guar or guar derivative; and contacting the guar or guar derivative to the seed to coat all or a portion of the seed.

In one embodiment, the seed coating composition is of substantially uniform size of from between 10 micrometers and 4 mm in diameter. In another embodiment, the seed coating composition is of substantially uniform size of from between 25 micrometers and 2 mm in diameter. In a further, the seed coating composition is of substantially uniform size of from between 500 micrometers and 2 mm in diameter.

Coating Techniques

Suitable coating techniques may be utilized to coat the seeds or agglomeration of seed of the dry seed coating compositions described herein. Equipment utilized to for coating can include but are not limited to drum coaters, rotary coaters, tumbling drums, fluidized beds and spouted beds, but any suitable equipment or technique may be employed. The seeds may be coated via a batch or continuous coating process.

The seeds can be separated prior to coating which, in one embodiment, utilizes mechanical means such as a sieve. The separated seeds can then be introduced into a coating machine having a seed reservoir. In one embodiment, the seeds in the mixing bowl are combined with one or more of the coatings described herein and adhered with a binder or adhesive.

In one embodiment of the process, one or more layers as described herein can be added to coat the seed or agglomeration. Outer layers can be introduced sequentially to the rotating drum.

In another embodiment, agglomerators or agglomerator devices may also be utilized. Coating is performed within a rotary coater by placing seeds within a rotating chamber, which pushes the seeds against the inside wall of the chamber. Centrifugal forces and mixing bars placed inside the coater allow the seed to rotate and mix with a coating layer. Binder or other coating materials can be pumped into the proximate center of the coater onto an atomizer disk that rotates along with the coating chamber. Upon hitting the atomizer disk, liquid adhesive is then directed outward in small drops onto the seed.

In one embodiment, seed coating techniques include, for example, seed in a rotating pan or drum. Seed is then mist with water or other liquid and then gradually a fine inert powder, e.g., Diatomaceous earth, is added to the coating pan. Each misted seed becomes the center of a mass of powder, layers, or coatings that gradually increases in size. The mass is then rounded and smoothed by the tumbling action in the pan, similar to pebbles on the beach. The coating layers are compacted by compression from the weight of material in the pan. Binders often are incorporated near the end of the coating process to harden the outer layer of the mass. Binders can also reduce the amount of dust produced by the finished product in handling, shipping and sowing. Screening techniques, such as frequent hand screening, are often times utilized to eliminate blanks or doubles, and to ensure uniform size. For example, tolerance for dry seed coating compositions described herein can be +/−1/64th inch (0.4 mm), which is the US seed trade standard for sizing, established long before coatings were introduced. For example, coated lettuce seed is sown most frequently with a belt planter through a 13/64 inch diameter round holes in the belt. This hole size requires that the dry seed coating compositions comprising lettuce seeds can be sized over a 7.5/64 inch screen and through an 8.5/64 inch screen.

In yet another embodiment, the dry seed coating compositions and methods described herein comprises "in situ coating". In situ coating means, in one embodiment, where a raw or non-coated seed is implanted in a hole, cavity or hollowed area in the ground and immediately or soon thereafter a coating composition is sprayed or applied directly into the hole, cavity or hollowed area to surround or partially surround the seed. Typically, the application of the seed as well as application of the coating composition are performed mechanically, but is understood that either or both of the referenced applications can be performed manually as well.

It is understood that embodiments other than those expressly described herein come within the spirit and scope of the present claims. Accordingly, the invention described herein is not defined by the above description, but is to be accorded the full scope of the claims so as to embrace any and all equivalent compositions and methods.

What is claimed is:

1. A method of applying a dry seed coating composition comprising:
   creating a hole in a soil with pressurized water or with aeration plug removal, introducing a seed into the soil; and
   in-situ coating the seed with the dry seed coating composition comprising at least 60 wt %, based on the weight of the composition, of guar or derivatized guar, wherein the derivatized guar is one or more selected from the group consisting of carboxymethyl guar, hydroxyethyl guar, hydroxypropyl guar, carboxymethylhydroxypropyl guar, cationic hydroxylpropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, and hydrophobically modified cationic guar, wherein the cationic hydroxylpropyl guar or the cationic hydrophobically modified hydroxypropyl guar include trimethylamino (2-hydroxyl) propyl, with chloride as a counter ion, wherein the in-situ coating comprises:
introducing the seed coating composition onto the soil by spraying the seed coating composition with pressurized air on a soil surface in a target soil area, and introducing the seed in the soil in the target soil area, wherein the seed coating composition promotes seedling establishment through water retention or water absorption compared to when the seed is not coated with the dry seed coating composition.

2. The method of claim 1, where the soil surface comprises a hole therein and the introduced seed coating composition is sprayed into the hole.

3. The method of claim 1, where the target soil area is over a field, in a plant row, or in a pocket near a plant.

4. The method of claim 1, where the seed is an agglomerate that is a grouping of 2 or more individual seeds together.

5. The method of claim 1, where the seed is pre-coated.

6. The method of claim 1, where the seed is non-coated.

7. The method of claim 1, wherein said introducing the seed includes sowing the seed with a seeding mechanism including a belt, a plate, a cup, or a vacuum.

8. The method of claim 1, where the spraying occurs directly onto the seed to form a seed coated with the dry seed coating composition.

9. The method of claim 1, where the seed coating composition comprises a starch binder that is one or more selected from the group consisting of a derivatized cationic starch, a corn starch, a wheat starch, a rice starch, a potato starch, a tapioca, a waxy maize, a sorghum, a waxy sarghum, a sago, a dextrin, a malto-dextrin, a chitin, a chitosan, an alginate, a xanthan gum, a carageenan gum, a gum karaya, a gum arabic, a tragacanth gum, a polysaccharide gum, a pectin, a cellulose, an ethylcellulose, a methylcellulose, a hydroxycellulose, a hydroxymethyl cellulose, a hydroxyethyl cellulose, hydroxymethylpropyl-cellulose, a carboxymethylcellulose, a carboxymethylhydroxyethyl cellulose, and a hydroxypropyl cellulose.

10. The method of claim 1, where the seed coating composition comprises one or more from the group consisting of a molasses, a granulated sugar, a mucilage, a gelatin, a polyvinyl acetate, a polyvinyl acetate copolymer, a polyvinyl alcohol, a polyvinyl alcohol copolymer, a polyvinylpyrolidone, a fat, an oil, a protein, a shellac, a vinylidene chloride, a vinylidene chloride copolymer, a calcium lignosulfonate, a poly(acrylic acid), an acrylic copolymer, a polyacrylate, a polyvinylacrylate, a zein, a chitosan, a polyethylene oxide, a poly(ethylene glycol), poly(methacrylic acid), an acrylimide polymer, a polyamide, a polyacrylamide, an acrylamide copolymer, a polyhydroxyethyl acrylate, a methylacrylimide monomer, an ethylcellulose, a polychloroprene, a polytetrahydrofuran, a polyglycerol, a poly(vinyl alcohol), a phosphonate-end capped polymer, and a syrup.

11. The method of claim 1, further comprising:
mixing the seed coating composition and the soil in a target soil area.

12. A method of applying a dry seed coating composition comprising:
introducing a seed into a soil; and
in-situ coating the seed with the dry seed coating composition comprising at least 60 wt %, based on the weight of the composition, of guar or derivatized guar,
where the derivatized guar is one or more selected from the group consisting of carboxymethyl guar, hydroxyethyl guar, hydroxypropyl guar, carboxymethylhydroxypropyl guar, cationic hydroxylpropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, and hydrophobically modified cationic guar,
where the cationic hydroxylpropyl guar or the cationic hydrophobically modified hydroxypropyl guar include trimethylamino (2-hydroxyl) propyl, with chloride as a counter ion, and
wherein the seed coating composition promotes seedling establishment through wetting adjacent areas of soil around the seed compared to when the seed is not coated with the dry seed coating composition.

13. A method of applying a dry seed coating composition comprising:

introducing a seed into a soil; and in-situ coating the seed with the dry seed coating composition comprising at least 60 wt %, based on the weight of the composition, of guar or derivatized guar, where the derivatized guar is one or more selected from the group consisting of carboxymethyl guar, hydroxyethyl guar, hydroxypropyl guar, carboxymethylhydroxypropyl guar, cationic hydroxylpropyl guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, and hydrophobically modified cationic guar, where the cationic hydroxylpropyl guar or the cationic hydrophobically modified hydroxypropyl guar include trimethylamino (2-hydroxyl) propyl, with chloride as a counter ion, where the seed coating composition comprises an active ingredient that is one or more selected from the group consisting of an herbicide, a plant growth regulator, a crop desiccant, a fungicide, a bacteriocide, a bacteriostat, an insecticide, a miticide, an insect repellant, an adjuvant, a surfactant, and a fertilizer, where the miticide is one or more selected from the group consisting of a propynyl sulfite miticide, a triazapentadiene miticide, a chlorinated aromatic miticide, and a dinitrophenol miticide, and wherein the seed coating composition promotes seedling establishment and protects against water loss compared to when the seed is not coated with the dry seed coating composition.

14. The method of claim 13, where the herbicide is one or more selected from the group consisting of a triazine herbicide, a sulfonylurea herbicide, a uracil herbicide, a urea herbicide, an acetanilide herbicide, and an organophosphonate herbicide.

15. The method of claim 13, where the fungicide is one or more selected from the group consisting of a nitrilo oxime fungicide, an imidazole fungicide, a triazole fungicide, a sulfenamide fungicide, a dithio-carbamate fungicide, a chloronated aromatic fungicide, and a dichloro aniline fungicide.

16. The method of claim 13, where the insecticide is one or more selected from the group consisting of a carbamate insecticide, an organo thiophosphate insecticide, and a perchlorinated organic insecticide.

* * * * *